United States Patent

DeBaun

[15] 3,685,355
[45] Aug. 22, 1972

[54] AIR MONITORING SYSTEM
[72] Inventor: Kenneth W. DeBaun, Novato, Calif.
[73] Assignee: Air Monitor Corporation, Santa Rosa, Calif.
[22] Filed: April 13, 1970
[21] Appl. No.: 27,758

[52] U.S. Cl. .................................................. 73/212
[51] Int. Cl. .................................................. G01f 1/00
[58] Field of Search ........................... 73/212, 205 L

[56] References Cited

UNITED STATES PATENTS

| | | | |
|---|---|---|---|
| 3,285,062 | 11/1966 | Flader | 73/212 X |
| 3,349,619 | 10/1967 | Millar | 73/205 L |

FOREIGN PATENTS OR APPLICATIONS

| | | | |
|---|---|---|---|
| 724,276 | 2/1955 | Great Britain | 73/212 |
| 405,986 | 11/1924 | Germany | 73/212 |
| 169,902 | 9/1965 | U.S.S.R. | 73/212 |
| 1,080,143 | 8/1967 | Great Britain | 73/212 |

Primary Examiner—Richard C. Queisser
Assistant Examiner—John P. Beauchamp
Attorney—Eckhoff and Hoppe

[57] ABSTRACT

An air monitoring system is provided for direct measurement of the volume of air flow, and its velocity and pressure in one or a composite of several air ducts. The system includes flow measuring stations which are installed in each duct as a permanent part thereof. Air moving in the duct first passes through a flow straightening section in each station which comprises a honeycomb of short, axially extending passages. Movement of the air through the straightening section eliminates turbulence in the entering air and produces substantially laminar air flow. A plurality of total pressure sensors are positioned in one or more traverses across, immediately adjacent to, and downstream of the straightening section to sense the total pressure of the flowing air. The total pressure values sensed by the several sensors are averaged by a manifold which connects with each of them. The individual total pressure sensors are so distributed as to be at the center of cross-sectional segments of the duct having equal areas. Static pressure at each station is also sensed by static pressure sensing tips, averaged and used with the total pressure to determine air flow. A tube leading directly from a remotely located manometer is connected to the manifold of the total pressure sensors at a point symmetrically arranged with respect to the total pressure sensors.

10 Claims, 5 Drawing Figures

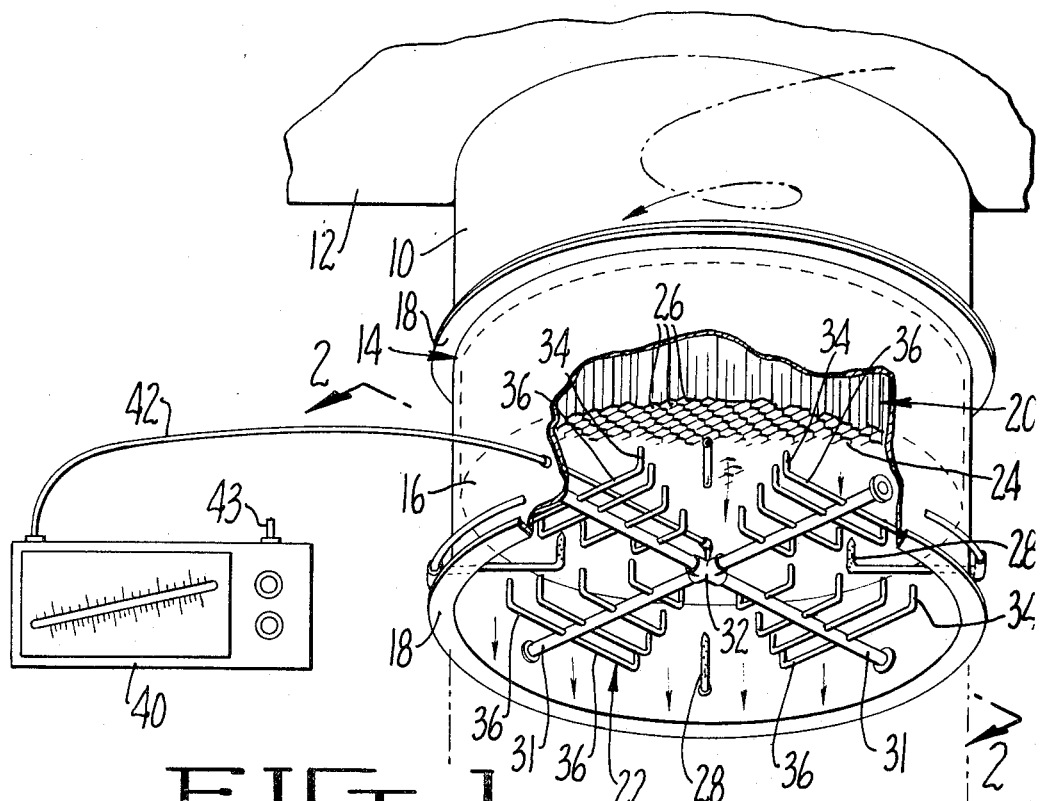
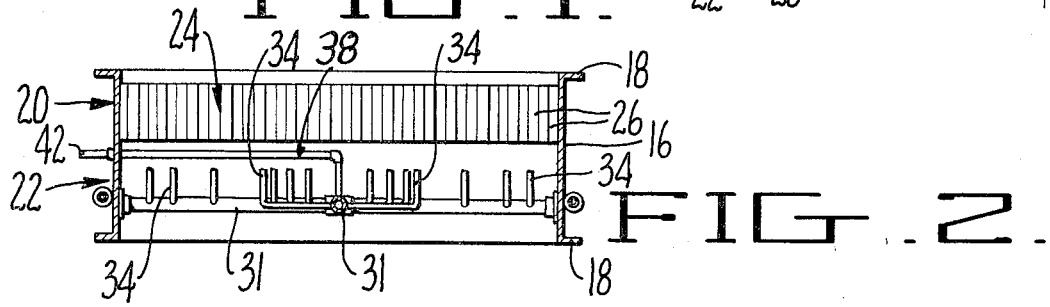
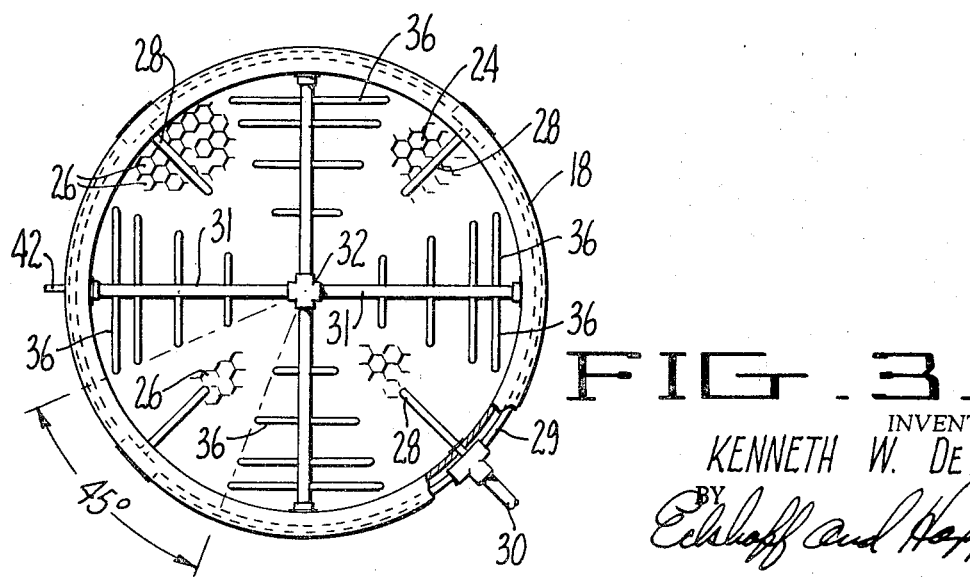

AIR MONITORING SYSTEM

This invention relates to air monitoring systems and more particularly to flow measuring stations for the direct measurement of the flow volume, velocity, and pressure of air flowing through a duct or system of ducts.

Air is used as the medium of thermal transfer in all forced-air heating, ventilating and air-conditioning systems. In such systems the movement and distribution of adequate quantities of processed air to maintain space temperatures, air changes, humidity levels, etc., is the principal design consideration. Accordingly, it is important to be able to accurately measure the air flow and other parameters at various points in the system to see if the system is performing according to design. Heretofore, the measurement of air flow in an air distribution system often has been arbitrary in procedure, inconsistent in result, controversial in technique and generally of questionable reliability and accuracy.

The present invention has for one object the provision of a system including one or more air flow measuring stations which are simple in construction and reliable in operation and which may be installed as permanent parts of the system.

Another object of the invention is to provide means for accurately sensing and automatically averaging one or more pressure traverses at a flow measuring station with which to determine the quantity of duct air flow, its velocity and pressure.

A preferred embodiment of the individual flow measuring stations of the invention is shown in the accompanying drawings and is described in detail hereinafter to illustrate one manner in which the invention may be practiced. It is to be understood, however, that the accompanying drawings and description are by way of example only and are not intended to define or limit the invention. In the drawings:

FIG. 1 is a perspective view, partly in section, showing one flow measuring station constructed in accordance with the teachings of the invention, mounted in an outlet air duct drop to a ceiling diffuser;

FIG. 2 is a sectional view taken along the line 2—2 in FIG. 1 looking in the direction of the arrows;

FIG. 3 is a bottom view looking into the flow measuring station of FIG. 1 in the upstream direction;

Figure 4:
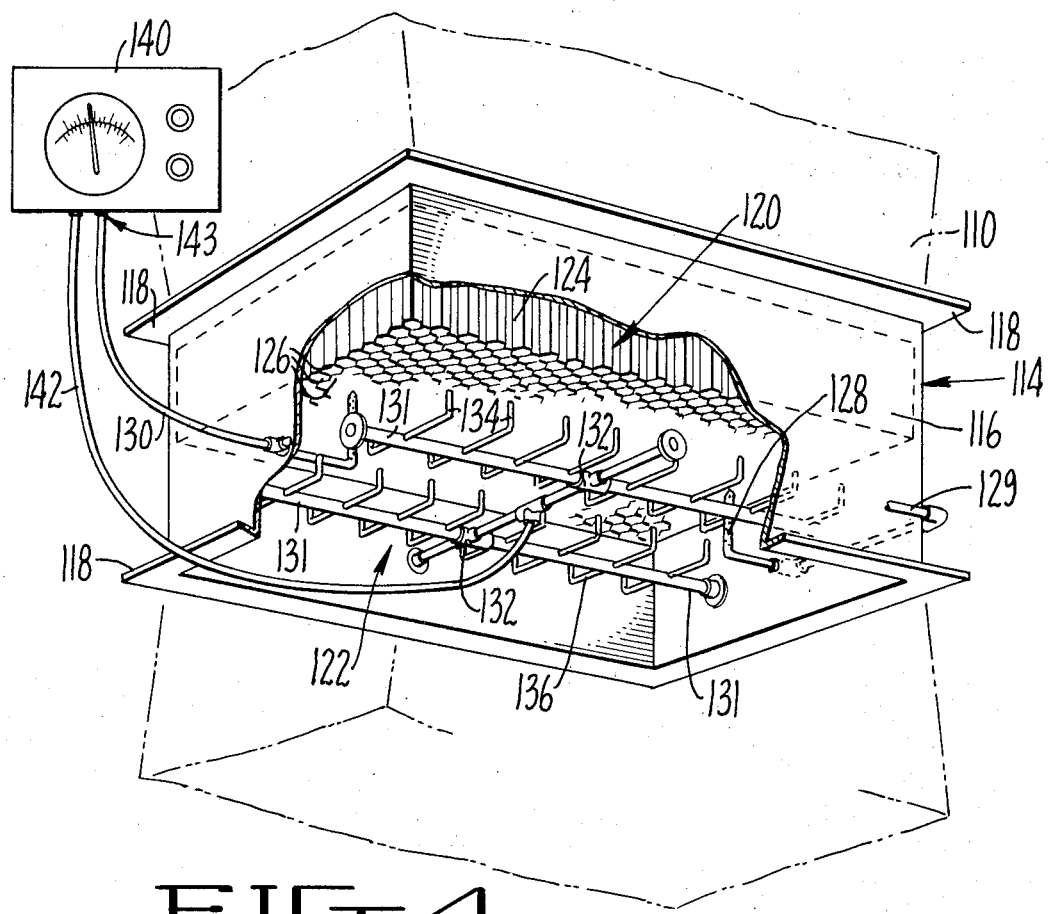
FIG. 4 is a perspective view, partly in section, showing the invention adapted to a rectangular duct.

FIG. 1 illustrates an outlet duct drop for a ceiling diffuser in an air conditioning system. The duct drop 10, which is circular in cross-section, drops downwardly from a main duct 12 that is only partly shown. A flow measuring station 14 constructed in accordance with the teachings of the invention mounts in the duct drop intermediate the main duct and the ceiling diffuser (not shown) downstream of it.

The station comprises a generally cylindrical casing 16 which has flanges 18, 18 at its ends for connection to non-metering portions of the air duct such as 10. In general, the flow measuring station is made up of two sections; an air-flow straightening section 20 and a metering section 22. The function of the air flow straightening section is to eliminate rotation and turbulence in the air entering the device and to establish substantially laminar air flow into the metering section 22.

In the form of the invention shown in the drawings, the air flow straightening section preferably comprises an expanded aluminum honeycomb 24. The honeycomb 24 forms a plurality of relatively small, axially extending passages 26, 26 that fill the entire cross-section of the monitor casing 16. The depth, or axial extent, of the honeycomb 24 is significant and is at least greater than the diameter of the passages 26, 26 therein. The wall thickness of the honeycomb 24, however, is extremely small with the result that there is a negligible loss of air pressure when air flows through the honeycomb passages.

In the second, or metering section 22 of the station, a plurality of static pressure sensing tips 28, 28 are spaced uniformly through the cross-section of the casing 16. They are manifolded together with tubing 29 to provide an average static pressure value as at 30. The static sensing tips 28, 28 are closed end-tubes perforated with a plurality of holes around the peripheries of their ends directed toward the air stream.

A total pressure sensing network is also provided. In the illustrated embodiment this network consists of two manifold tubes 31, 31 oriented substantially at right angles to each other and interconnected at their centers 32. Each of the manifold tubes 31, 31 is connected with a plurality of total pressure sensors 34, 34 that are so arranged as to have their sensing ends positioned immediately adjacent to and downstream of the honeycomb of passages 26, 26 in the air straightening section 20. Each sensor 34, 34 is disposed parallel to the direction of airflow through the casing. This disposes the sensors at right angles to the manifold tubes 31, 31 since the latter are disposed traversely to the direction of air flow through the casing. Small tubular conduits 36, 36 are provided to communicate the sensors 34, 34 with the manifold tubes. The terminal ends of the manifold tubes 31, 31 are closed off at the casing 16. Conduit 38 communicating with the intersection of the manifold tubes is connected to a remotely located manometer 40 through an external conduit 42.

Since this is a dynamic system, it takes a certain amount of time for a variation in pressure to be transmitted from an individual sensor to the collecting conduit. Therefore, pressure changes sensed by a sensor located immediately adjacent the collecting place will necessarily affect the average pressure faster than would a similar change sensed by a sensor located further from the collecting place. Conduit 38 is connected to the manifold tubes in symmetrical relationship with the individual pressure sensors 34 so as to minimize any adverse effects due to this unequal influence of individual sensors. The effects of the closest in pressure sensors will still be greater than the effects of the pressure sensors placed farther away; however, a plurality of symmetrically similarly placed sensors will also be supplying pressures to the connecting point of conduit 38 to thereby average out any errors in a particular sensor.

In one aspect of the invention the total pressure sensors 34, 34 are positioned at the centers of cross-sectional casing segments of equal area. As will be best seen by reference to FIG. 3, the sensors 34, 34 are each disposed in alignment along radial axes that are spaced every 45°. In addition, the radial distance between adjacent sensors decreases as the location of the sensors increases relative to the center of the casing. In this way each sensor is so positioned as to lie approximately at the center of a cross-sectional segment of the casing that is equal in area to the cross-sectional casing segment within which each of the other sensors is centered.

The average static pressure at 30 also communicates with the meter 40 through conduit 43. The total pressure communicated to meter 40 by conduit 42 is the average of the total pressure sensed by the collective number of total pressure sensors 34 automatically derived by the manifolding which connects them all together.

Figure 5:
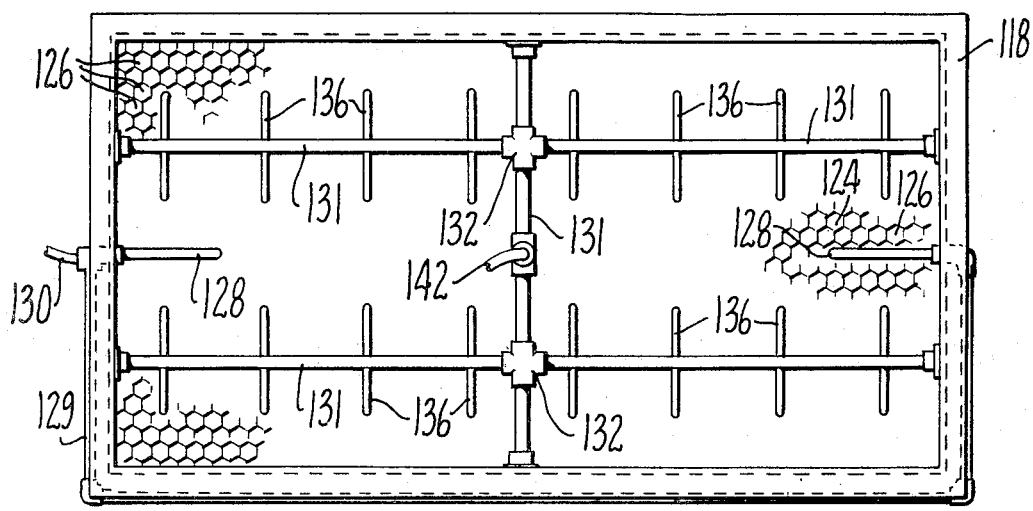
FIG. 5 is a bottom view looking into the station shown in FIG. 4 in the upstream direction.

FIGS. 4 and 5 illustrate an application of the invention to a rectangular duct. The construction of the flow measuring station is the same as previously described except that the outer casing 116 is rectangular rather than cylindrical, and the arrangement of the total pressure sensors 134, 134 is necessarily different from that of a cylindrical device but each senses the total pressure over an equal segment of the total casing cross-section. The parts corresponding to those of FIGS. 1–3 are designated by the same two-digit reference character in FIGS. 4 and 5 preceded by 1 to form a set of corresponding three-digit characters. As shown in FIG. 4, the output of the manifold tubes 131, 131 is transmitted by conduit 142 to a so-called "dry" meter or manometer 140. The meter receives the average static pressure at connection 143.

In the operation of each flow measuring station the entering air may have much turbulence. This turbulence is substantially eliminated by the honeycomb 24. Because of the parallel configuration of the passages 26, 26 in the honeycomb the airflow at the downstream end thereof is substantially laminar and strikes the total pressure sensors 34, 34 in a direction parallel to the direction of the tube openings. This greatly enhances the accuracy of the readings obtained by the sensors. An average of all the readings of the sensors is obtained in the manifold tubes 31, 31 which connect with each of the individual sensors 34, 34. The total pressure at the manometer 40, therefore, represents the average total pressure in the casing 16 and the static pressure at 43 is the average static pressure at the static pressure sensing tips. Inasmuch as the cross-sectional area of the casing 16 is constant and known, the volume of air passing through the casing may be read directly on the meter by appropriate calibration of it or the static pressure or air velocity can be read directly in similar fashion.

I claim:

1. An air flow measuring station for sensing pressures in an air duct having air flowing therethrough and for supplying the sensed pressures to a measuring means, said station comprising an air flow straightening section arranged in said duct for producing substantially laminar air flow; a plurality of total pressure sensors positioned in said duct immediately adjacent to and downstream of said air straightening section; manifold means for communicating each of said total pressure sensors with one another; and conduit means for communicating the pressure existing in the manifold means with the measuring means, said conduit means being connected to said manifold means at a connecting place arranged symmetrically with respect to the total pressure sensors whereby an average total pressure in said duct is supplied to said conduit means.

2. An air flow measuring station as set forth in claim 1, wherein said air flow straightening section comprises a plurality of parallel, axially extending passages and wherein each of said total pressure sensors is positioned at the center of respective cross-sectional segments of said station which are equal in area to one another.

3. An air flow measuring station as set forth in claim 3 wherein said parallel axial passages are formed by a honeycomb section which completely fills the cross-section of the station.

4. An air flow measuring station as set forth in claim 4 wherein the longitudinal extent of the honeycomb section is greater than the diameters of the openings in the honeycomb.

5. An air flow measuring station as set forth in claim 1 further including means sensing and averaging the static pressure substantially at the plane of the openings of said total pressure sensors; and meter means utilizing the average total pressure and the average static pressure to derive an output proportional to air velocity and flow volume.

6. An air flow measuring station as set forth in claim 1 wherein said connecting place is arranged symmetrically with respect to the internal volume of said manifold means.

7. An air flow measuring station as set forth in claim 1, wherein all of said total pressure sensors have openings terminating substantially in a single plane extending transverse to the direction of air flow through the air duct.

8. An air flow measuring station as set forth in claim 4, wherein said station includes an outer casing forming a portion of the duct.

9. An air flow measuring station as set forth in claim 6, wherein said manifold means consists of two mutually perpendicular pipes intersecting and communicating with one another at the connecting place and a plurality of rigid tubes on each pipe, each of said rigid tubes extending perpendicularly an equal distance from both sides of the respective pipes, one total pressure sensor being arranged at each end of each of the rigid tubes, the diameter of said rigid tubes being substantially less than the diameter of said pipes.

10. An air flow measuring station as set forth in claim 5, wherein the means sensing and averaging the static pressure comprises a plurality of manifolded closed end-tubes each perforated with holes transversely with respect to the direction of air flow.

* * * * *

UNITED STATES PATENT OFFICE
CERTIFICATE OF CORRECTION

Patent No. 3,685,355          Dated August 22, 1972

Inventor(s) Kenneth W. De Baun

It is certified that error appears in the above-identified patent and that said Letters Patent are hereby corrected as shown below:

Claim 3, line 2, "3" should read -- 2 -- ; claim 4, line 2, "4" should read -- 3 -- .

Signed and sealed this 1st day of May 1973.

(SEAL)
Attest:

EDWARD M. FLETCHER, JR.          ROBERT GOTTSCHALK
Attesting Officer                Commissioner of Patents